United States Patent
Zhang et al.

(10) Patent No.: US 11,863,277 B2
(45) Date of Patent: Jan. 2, 2024

(54) METHOD AND APPARATUS FOR BEAM SWEEPING FOR CSI-RS MOBILITY MEASUREMENT

(71) Applicant: Apple Inc., Cupertino, CA (US)

(72) Inventors: Yushu Zhang, Cupertino, CA (US); Jie Cui, Cupertino, CA (US); Dawei Zhang, Cupertino, CA (US); Hong He, Cupertino, CA (US); Yang Tang, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/598,210

(22) PCT Filed: Apr. 8, 2020

(86) PCT No.: PCT/CN2020/083820
§ 371 (c)(1),
(2) Date: Sep. 24, 2021

(87) PCT Pub. No.: WO2021/203323
PCT Pub. Date: Oct. 14, 2021

(65) Prior Publication Data
US 2023/0028356 A1    Jan. 26, 2023

(51) Int. Cl.
*H04B 7/06*    (2006.01)
*H04B 7/08*    (2006.01)

(52) U.S. Cl.
CPC .......... *H04B 7/0695* (2013.01); *H04B 7/088* (2013.01)

(58) Field of Classification Search
CPC ..... H04B 7/0695; H04B 7/088; H04L 5/0023; H04L 5/0048; H04L 5/0053; H04W 24/08; H04W 48/16
See application file for complete search history.

(56) References Cited

U.S. PATENT DOCUMENTS

| | | | |
|---|---|---|---|
| 10,651,989 B2 * | 5/2020 | Noh | H04L 5/005 |
| 11,251,921 B2 * | 2/2022 | Kwak | H04W 72/0453 |
| 11,374,712 B2 * | 6/2022 | Yum | H04B 7/0626 |
| 2021/0111846 A1 * | 4/2021 | Lee | H04W 72/04 |
| 2022/0124782 A1 * | 4/2022 | Park | H04W 72/044 |

* cited by examiner

*Primary Examiner* — Kenneth T Lam
(74) *Attorney, Agent, or Firm* — Womble Bond Dickinson (US) LLP

(57) ABSTRACT

A first CSI-RS signal is received by user equipment through a first cell, and a second CSI-RS signal is received through a second cell. Respective QCL information can be available to determine a first Rx beam to measure the first CSI-RS signal and a second Rx beam to measure the second CSI-RS signal. In such a case, if the first CSI-RS signal and the second CSI-RS signal are fully overlapped, then the user equipment can i) alternate between measuring the first CSI-RS signal with the first Rx beam and measuring the second CSI-RS signal with the second Rx beam, or ii) measure only the first CSI-RS signal or the second CSI-RS signal. Other embodiments are described and claimed.

20 Claims, 13 Drawing Sheets

METHOD AND APPARATUS FOR BEAM SWEEPING FOR CSI-RS MOBILITY MEASUREMENT

RELATED APPLICATIONS

The present application is the national phase of International Application No. PCT/CN2020/083820, filed on Apr. 8, 2020 and the disclosure of which is hereby incorporated herein by reference in its entirety.

FIELD OF INVENTION

This invention relates generally to wireless technology and more particularly to beam sweeping for CSI-RS mobility measurement.

BACKGROUND OF THE INVENTION

In release 16 of 5G standard, mobility can be based on channel state information reference signal (CSI-RS). It is unclear, however, regarding how to measure CSI-RS for frequency range 2 (FR2), e.g., neighboring cell beam information for a CSI-RS beam signal.

A CSI-RS beam and information thereof can be represented using quasi co-location (QCL) between reference signals. A defined user equipment (UE) behavior, however, is needed to address different scenarios and conditions with respect to a serving cell, a neighboring cell, and CSI-RS beams that are received through these cells. UE behavior for beam sweeping should address how to measure CSI-RS of both the serving cell and the neighbor cell under various conditions.

SUMMARY OF THE DESCRIPTION

In some embodiments, a method is described that includes receiving a first CSI-RS signal through a first cell and a second CSI-RS signal through a second cell. If respective QCL information is available to determine a first Rx beam to measure the first CSI-RS signal and a second Rx beam to measure the second CSI-RS signal, then if the first CSI-RS signal and the second CSI-RS signal are fully overlapped, then the method includes a) alternating between measuring the first CSI-RS signal with the first Rx beam and measuring the second CSI-RS signal with the second Rx beam, b) measuring only the first CSI-RS signal with the first Rx beam, or c) measuring only the second CSI-RS signal with the second Rx beam. If some occasions of the second CSI-RS signal are not overlapped with the first CSI-RS signal, then the method includes a) measuring the second CSI-RS signal when not overlapped, and measuring the first CSI-RS signal when overlapped, or b) measuring the second CSI-RS signal when not overlapped, and alternating between measuring the first CSI-RS signal and the second CSI-RS signal when overlapped.

In some embodiments, a user equipment device that includes at least one antenna and one radio is described. The at least one radio is to perform cellular communications using a radio access technology that establishes a wireless link with a base station. The user equipment device further includes at least one or more processors that are configure to perform operations including, receiving a first CSI-RS signal through a first cell and a second CSI-RS signal through a second cell. If respective QCL information is available to determine a first Rx beam to measure the first CSI-RS signal and a second Rx beam to measure the second CSI-RS signal, then if the first CSI-RS signal and the second CSI-RS signal are fully overlapped, then the method includes a) alternating between measuring the first CSI-RS signal with the first Rx beam and measuring the second CSI-RS signal with the second Rx beam, b) measuring only the first CSI-RS signal with the first Rx beam, or c) measuring only the second CSI-RS signal with the second Rx beam. If some occasions of the second CSI-RS signal are not overlapped with the first CSI-RS signal, then the method includes a) measuring the second CSI-RS signal when not overlapped, and measuring the first CSI-RS signal when overlapped, or b) measuring the second CSI-RS signal when not overlapped, and alternating between measuring the first CSI-RS signal and the second CSI-RS signal when overlapped. Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

A method and apparatus of a device that measures a reference signal and manages Rx beams for communication between a user equipment device and a base station is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "some embodiments" or "an embodiment" means that a particular feature, structure, or characteristic described in connection with the embodiment can be included in at least one embodiment of the invention. The appearances of the phrase "in some embodiments" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that measures a reference signal used for downlink for a user equipment device and a base station is described. In some embodiments, the device is a user equipment device that has a wireless link with a base station. In some embodiments, the wireless link is a fifth generation (5G) link. The device further groups and selects component carriers (CCs) from the wireless link and determines a virtual CC from the group of selected CCs. The device additionally can perform a physical downlink resource mapping based on an aggregate resource matching patterns of groups of CCs.

Figure 1:
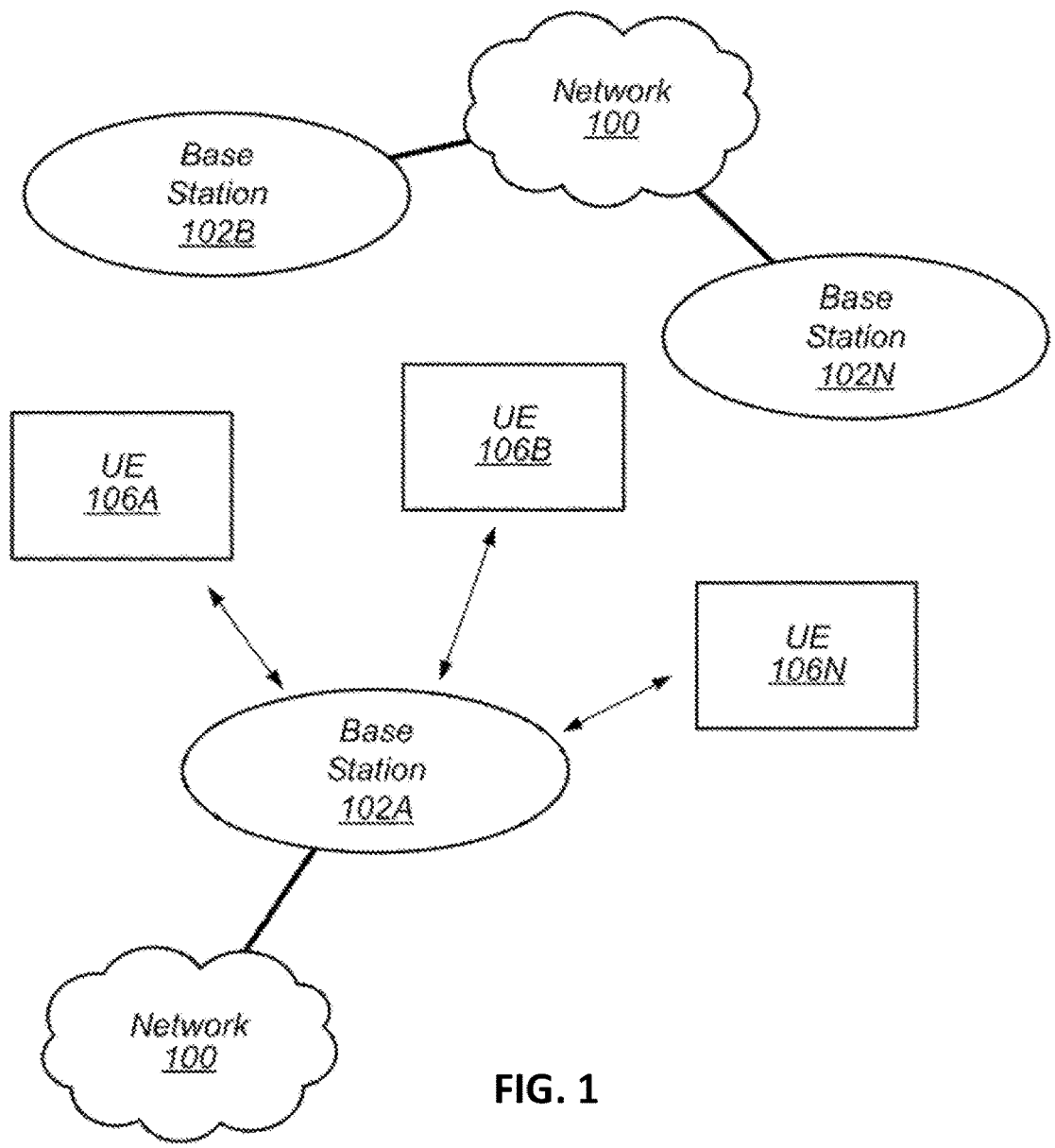
FIG. 1 illustrates an example wireless communication system according to some embodiments.

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

Figure 2:
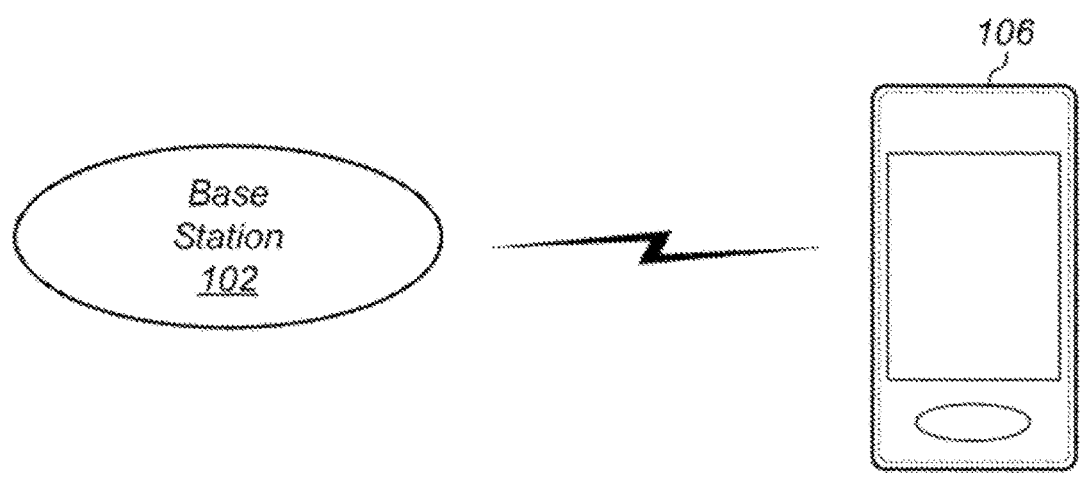
FIG. 2 illustrates a base station (BS) in communication with a user equipment (UE) device according to some embodiments.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. An antenna array (e.g., for MIMO) can be used to implement beamforming at the UE end to increase signal to noise ratio (SNR) and reduce channel interference of a single data stream. Rx beams can be generated by the antenna array, each of the Rx beams having predefined spatial location and/or direction relative to the user equipment device. An appropriate Rx beam can be selected that is optimally aligned to receive a transmitted beam from a base station or neighboring cell to provide improved communication quality. User equipment can use conventional or adaptive beam formers to generate a plurality of Rx beams. The beams can be generated by applying a spatial filter (e.g., phase shifts and amplitude weights) or other equivalent beamforming algorithms to each antenna in the antenna array.

In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 3:
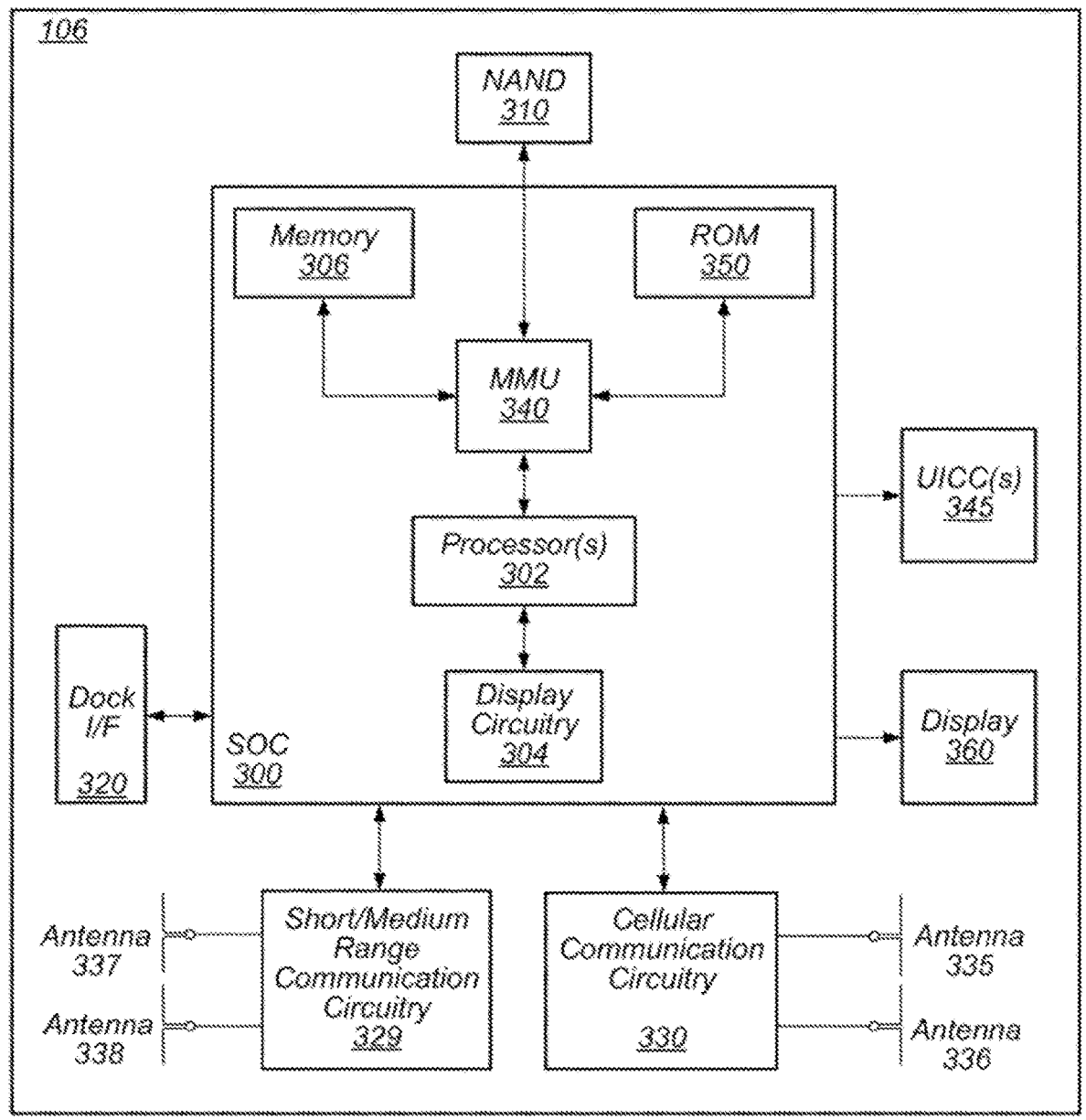
FIG. 3 illustrates an example block diagram of a UE according to some embodiments.

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple radio access technologies (RATs) (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may also be configured to determine a physical downlink shared channel scheduling resource for a user equipment device and a base station. Further, the communication device 106 may be configured to group and select CCs from the wireless link and determine a virtual CC from the group of selected CCs. The wireless device may also be configured to perform a physical downlink resource mapping based on an aggregate resource matching patterns of groups of CCs.

As described herein, the communication device 106 may include hardware and software components for implementing the above features for measuring reference signals (e.g., CSI-RS signals), manages Rx beams, and determining a physical downlink shared channel scheduling resource for a communications device 106 and a base station. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Figure 4:
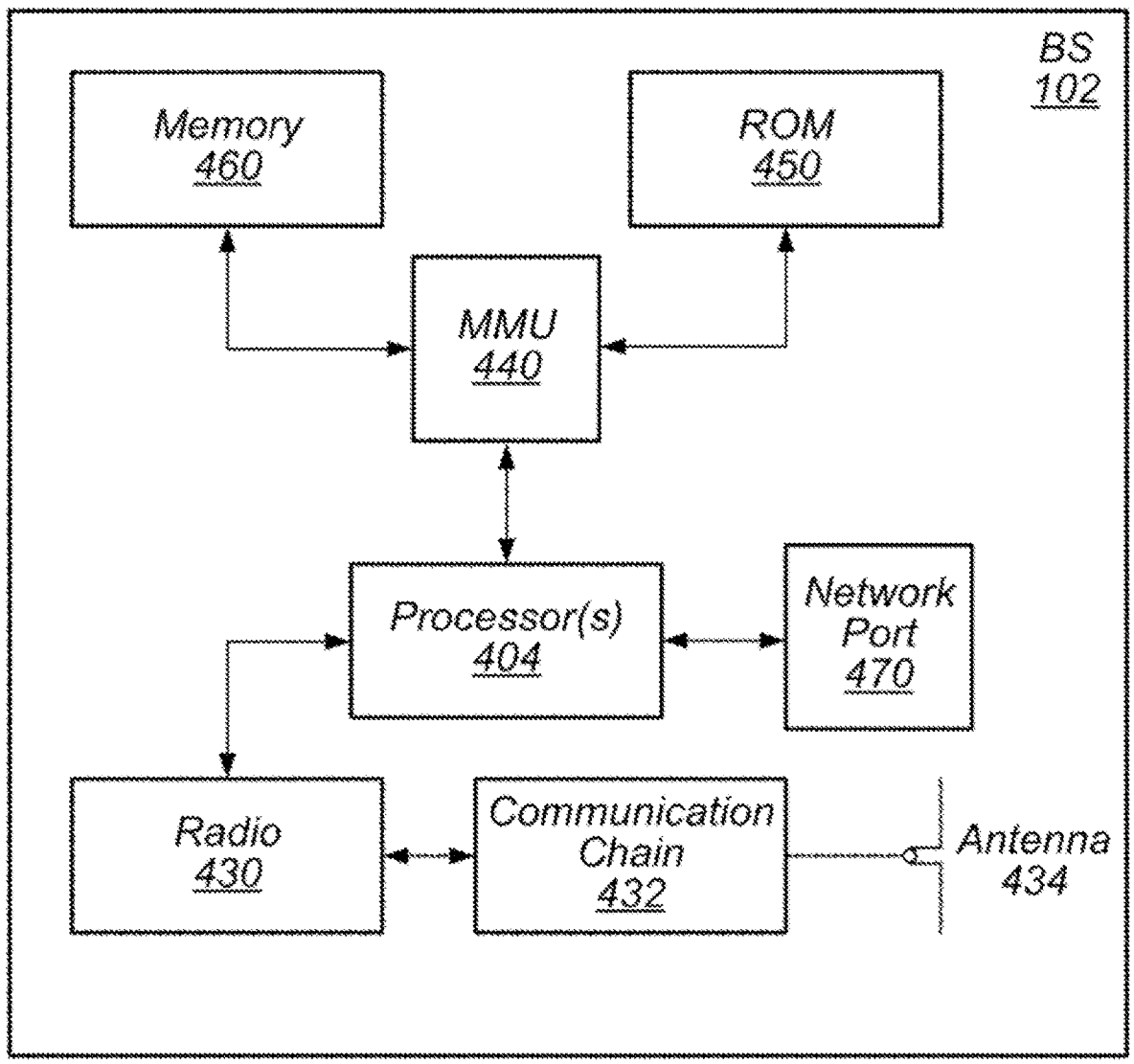
FIG. 4 illustrates an example block diagram of a BS according to some embodiments.

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
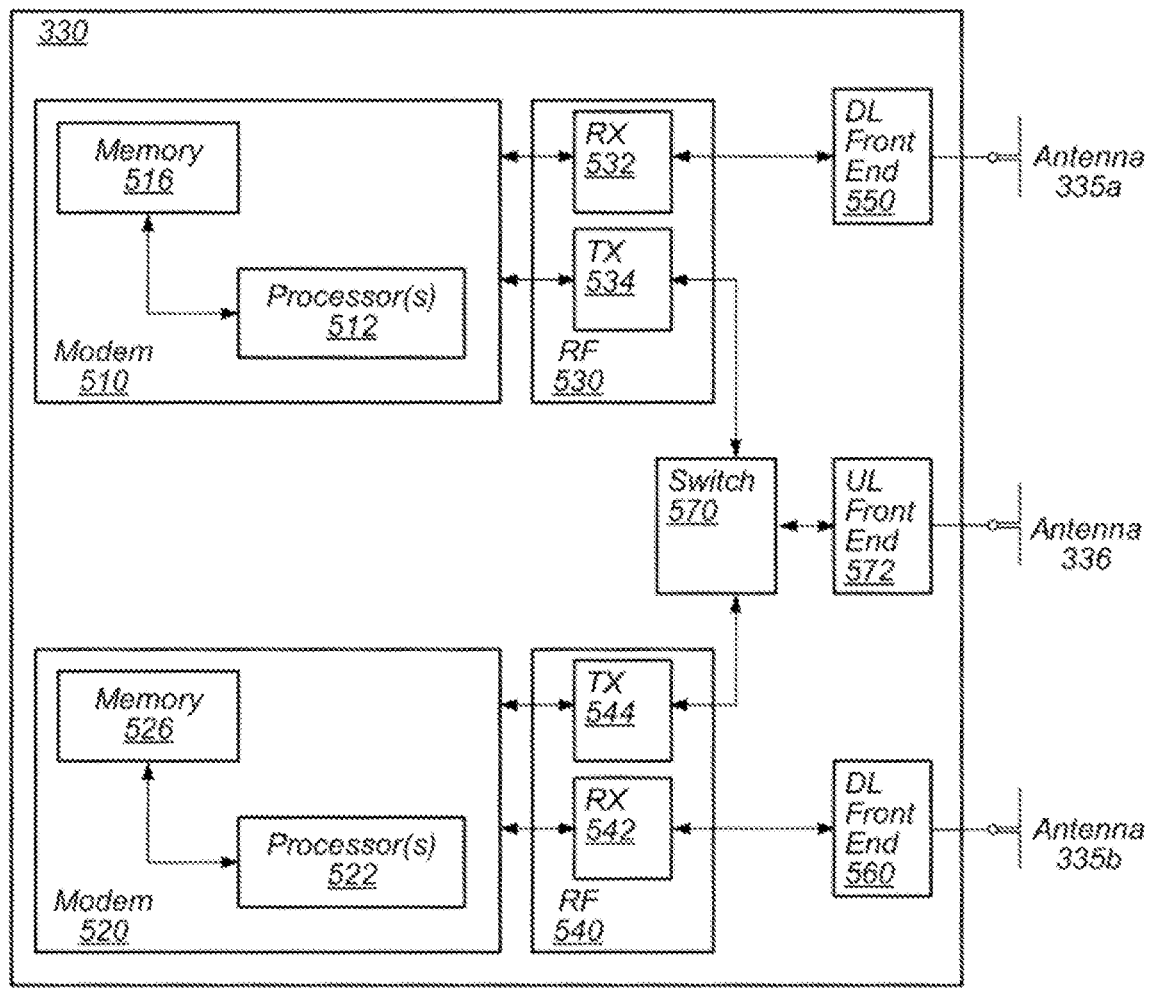
FIG. 5 illustrates an example block diagram of cellular communication circuitry, according to some embodiments.

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335 a-b and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

As described herein, the modem 510 may include hardware and software components for implementing the above features or for measuring one or more reference signals (e.g., CSI-RS signals) and determining a physical downlink shared channel scheduling resource for a user equipment device and a base station, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for measuring reference signals (e.g., CSI-RS signals), managing Rx beams, and determining a physical downlink shared channel scheduling resource for a user equipment device and a base station, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

Figure 6:
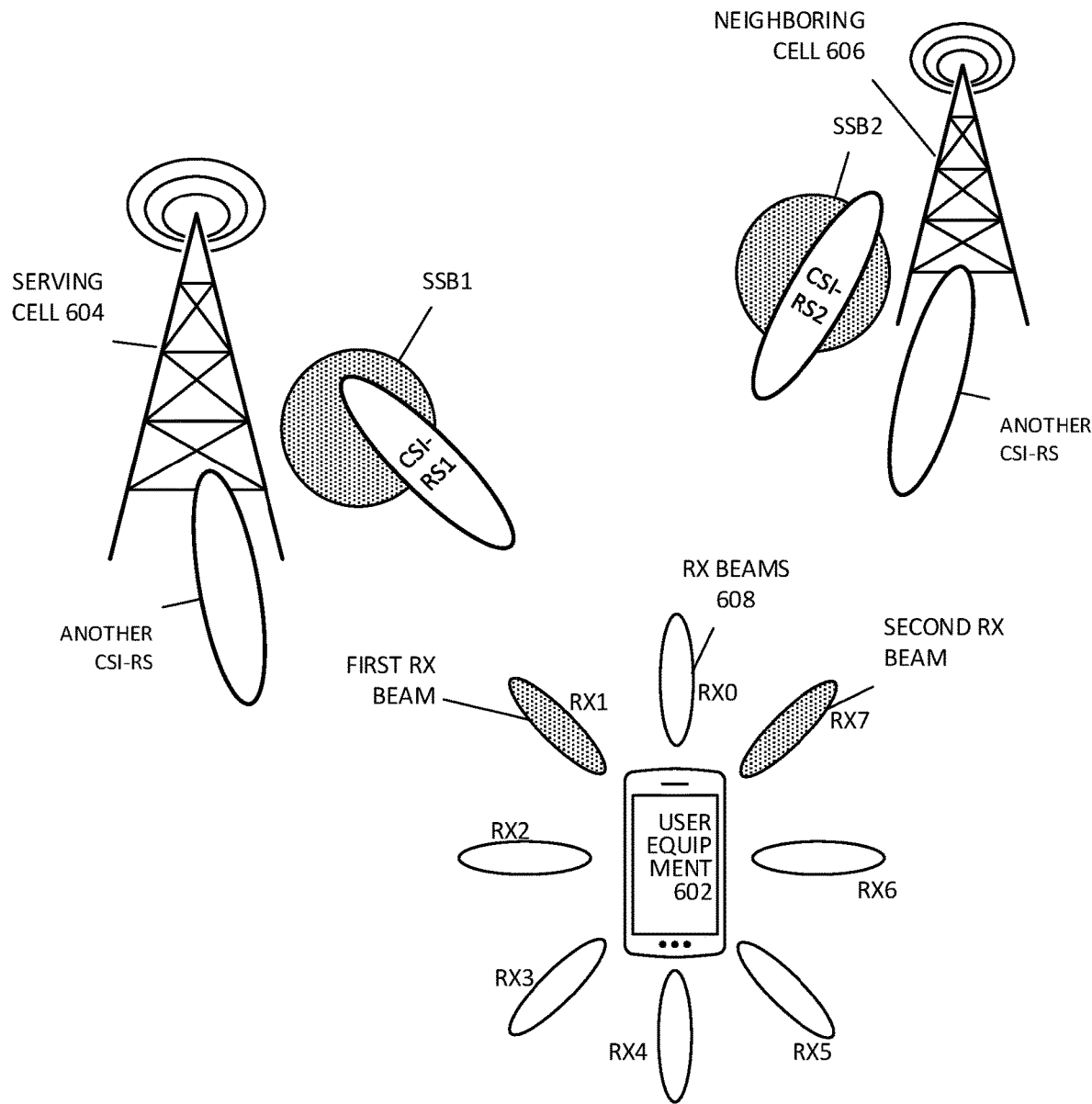
FIG. 6 illustrates UE in communication with a serving cell and neighbor cell, according to some embodiments.

FIG. 6 illustrates a UE device 602 in communication with a serving cell and neighbor cell, according to some embodiments. The UE 602 can include any or all of the features described in relation to UE 106. UE 602 can generate multiple local receiving (Rx) beams 608. These Rx beams can be formed at different positions around the UE to pick up wireless communication signals, e.g., electro-magnetic signals, from serving cell 604 and neighboring cell 606. Wireless signals can include channel state information reference signals (CSI-RS). These are downlink signals that are used to estimate channel and report channel quality information back to gNB. A CSI-RS signal can be periodic, semi-persistent, or aperiodic. The CSI-RS can be CSI-RS layer 3 mobility signal, used during mobility and beam management.

The serving cell 604 communicates CSI-RS1 (a first CSI-RS signal) to the UE. The CSI-RS1 can be quasi co-located (QCL) with a synchronization signal block (SSB1) or another CSI-RS signal transmitted from the serving cell. This QCL information can be used to determine which of the Rx beams 608 should be used to receive CSI-RS1.

Similarly, the neighboring cell 606 can communicate CSI-RS2 to the UE. CSI-RS2 can also be quasi co-located with SSB2 or another CSI-RS signal transmitted from the neighbor cell. This QCL information can be used to determine which of the Rx beams should be used to receive CSI-RS2.

In some cases, however, QCL information may not be available. The UE may need to determine which of the Rx beams 608 to use for performing CSI-RS1 and CSI-RS2 measurements. In addition, when there is overlap between the CSI-RS signals, (e.g., if the CSI-RS signals are on the same time occasion and require pickup by different Rx beams), the UE may need to prioritize one CSI-RS over another. The UE should have the capability to adapt under different scenarios to sufficiently measure CSI-RS signals from the serving cell and the neighbor cell.

FIG. 6 shows a first scenario where CSI-RS1 (a first CSI-RS signal) and CSI-RS2 (a second CSI-RS signal) are communicated with respective QCL information. Respective QCL information can include quasi co-location (QCL) between a) the first CSI-RS signal and a first synchronization signal block from the first cell, b) the first CSI-RS signal and another CSI-RS signal from the first cell, c) the second CSI-RS signal and a second synchronization signal block from the second cell, and/or d) the second CSI-RS signal and another CSI-RS signal from the second cell. A first Rx beam can be determined based on the QCL information associated with CSI-RS1 and a second Rx beam can be determined based on the QCL information associated with CSI-RS2.

For example, based on QCL between CSI-RS1 and SSB1, the UE can determine that Rx1 is appropriate to receive CSI-RS1. In other words, the signal strength of CSI-RS1 received through this beam can be higher than if received through other beams. The same holds true for determining an Rx beam for CSI-RS2 communicated from neighboring cell 606. Signals from different antenna ports of the same cell are said to be quasi co-located if properties of the channel over which a symbol on one antenna port is conveyed can be inferred from the channel over which a symbol on the other antenna port is conveyed.

Figure 7:
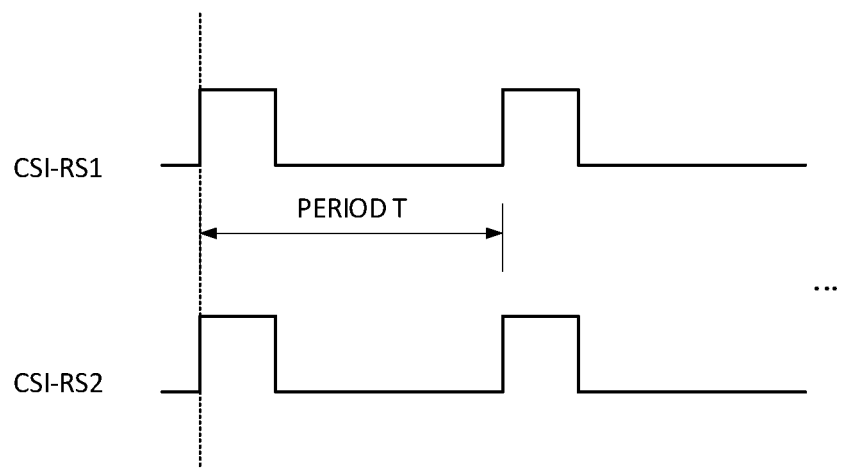
FIG. 7 and FIG. 8 illustrate examples of CSI-RS communications from cell towers, according to some embodiments.

In FIG. 6, the Rx beam that is selected by the UE to receive CSI-RS1 can be different from the Rx beam selected to receive CSI-RS2, because one Rx beam might be more optimal to receive CSI-RS1 while another Rx beam might be optimal to receive CSI-RS2. If the CSI-RS1 and CSI-RS2 signal overlap in the time domain (e.g., as shown in FIG. 7), the UE cannot measure those CSI-RS signals simultaneously by using different Rx beams, because the UE is limited to one active Rx beam at a given time. Under these conditions, two sub-scenarios are appreciated.

FIG. 7 shows a first sub-scenario where CSI-RS1 and CSI-RS2 are fully overlapped on time domain with the same time offset and same periodicity. In other words, the signals are arriving and occurring over the same time at the UE, periodically. In this sub-scenario, the UE can opt to receive and measure the signals in the following manners.

In a first option to address this first sub-scenario, the UE can determine or be provided a sharing factor X (e.g., 10%, 20%, 30%, 40%, 50%) through the network to allocate measurement resources. For example, if the sharing factor is 40% for CSI-RS1, then in four out of ten periods, the UE can receive and measure CSI-RS1 through Rx1, and in six out of ten periods, the UE can receive and measure CSI-RS2 through Rx2.

Under a second option and third option of the first sub-scenario, the UE can always prioritize receiving and measuring either CSI-RS1 or CSI-RS2. For example, the UE can receive and measure only CSI-RS1 (e.g., through Rx1). Alternatively, the UE can receive and measure only CSI-RS2 (e.g., through Rx7).

Figure 8:
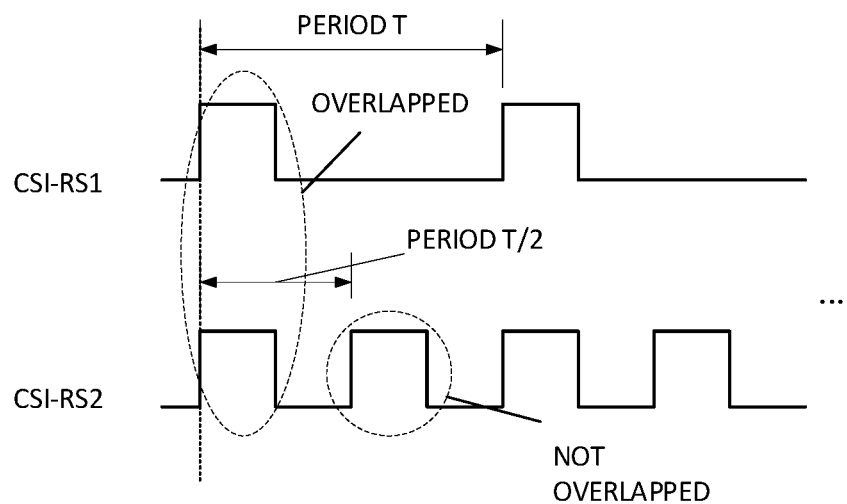

FIG. 8 shows a second sub-scenario, where the CSI-RS1 and CSI-RS2 are partially overlapped in the time domain, e.g., they can have the same time offset and different periodicity. In this example, CSI-RS1 has period T and CSI-RS2 has a periodicity T/2. Thus, some of the CSI-RS2 occasions (periods of signal transmission) are not overlapped with CSI-RS1. Given that some of these occasions of CSI-RS2 are alone, UE can opt to receive and measure the signals in the following manners.

In a first option for the second sub-scenario, the UE performs CSI-RS2 measurement through the Rx beam determined based on the QCL information (in this example, Rx7), when the CSI-RS2 is not overlapped with CSI-RS1. The UE performs CSI-RS1 measurement through the Rx beam determined based on the CSI-RS1 QCL information (in this example Rx1) when the signals are overlapped.

In a second option for the second sub-scenario, the UE performs CSI-RS2 measurement (with Rx7) when the signals are not overlapped. The UE can use sharing factor X to allocate measurement resource for CSI-RS1 and CSI-RS2 on the overlapped occasion. In other words, with this option, the CSI-RS2 measurement will be taken when the signals overlap, but when the signals do not overlap, the measurements can alternate between receiving and measuring CSI-RS1 (with Rx1) and CSI-RS2 (with Rx7).

It should be understood that, although this example and others are illustrated with Rx1 used to receive CSI-RS1 and Rx7 used to receive CSI-RS2, any of the beams can be selected for pickup of a respective CSI-RS based on the QCL information associated with the respective CSI-RS signal, or based on beam sweeping measurements. In some cases, the CSI-RS1 and CSI-RS2 can use the same Rx beam, in which case, both signals can be received and measured with the same Rx beam. It should further be understood that although the Rx beams are shown as Rx0 through Rx7 in illustrated examples, the number, location, directionality, and direction of beams can vary depending on application (e.g., capacity of the antenna array of the UE) without departing from the scope of the present disclosure.

Figure 9:
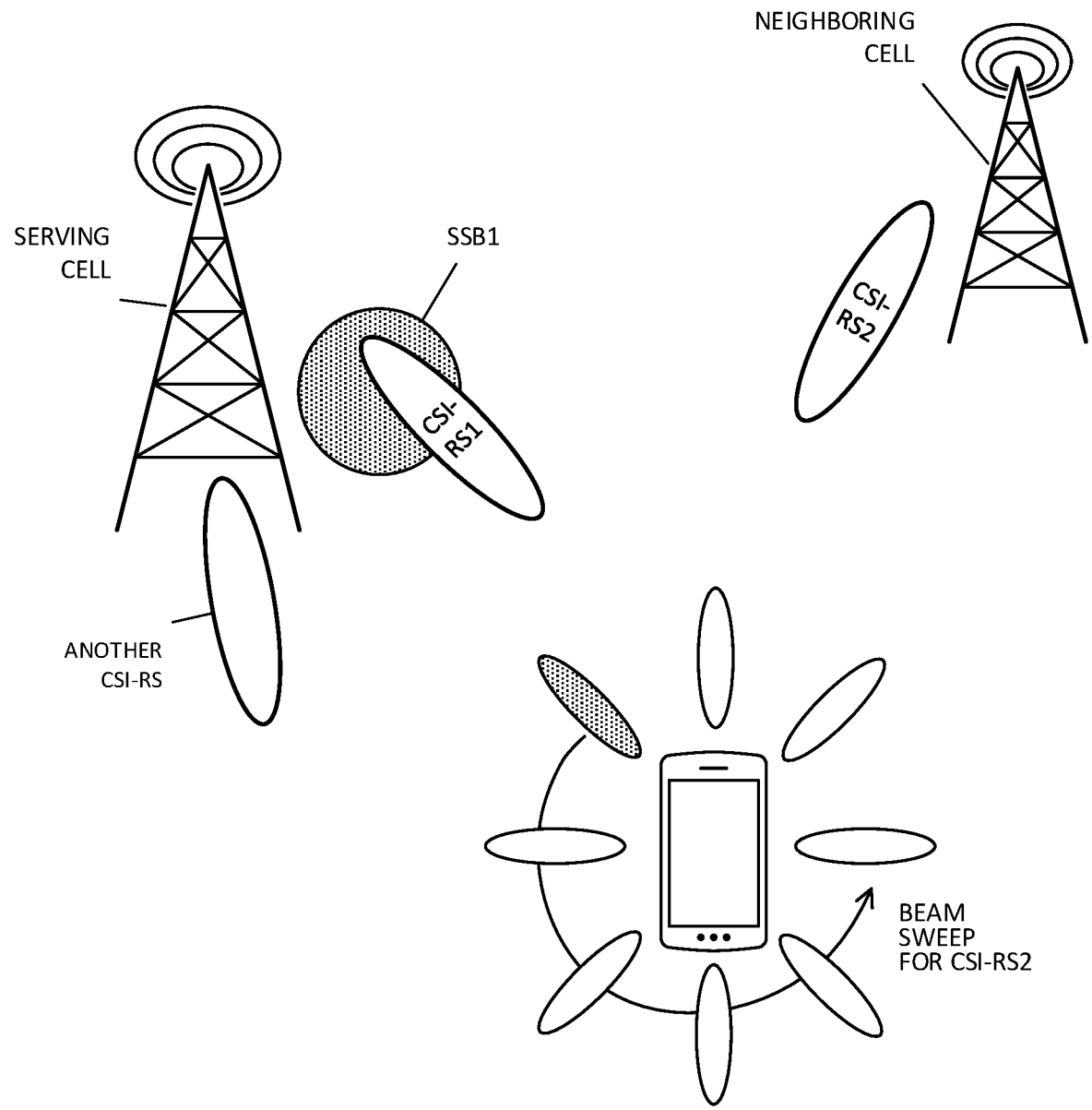
FIG. 9 illustrates UE in communication with a serving cell and neighbor cell where RX beam for receiving a CSI-RS is to be determined, according to some embodiments.

FIG. 9 shows a second scenario where a CSI-RS (e.g., CSI-RS1) of the serving cell has available QCL information, but CSI-RS (e.g., CSI-RS2) of the neighbor cell has no available QCL information. The lack of QCL information associated with a CSI-RS signal can be due to different factors, such as but not limited to a) the network does not indicate this QCL information to UE or it is physically blocked, b) a previous measurement based on QCL information times out and is no longer relevant or useful for QCL, and/or c) a source reference signal in QCL chain is not available.

In this example, an Rx beam (a first Rx beam) for receiving CSI-RS1 is known or determined through QCL information. CSI-RS2 from the neighboring cell, however, does not have QCL information available. In this case, UE can perform beam sweeping to find an Rx beam (a second Rx beam) that is optimal to receive CSI-RS2 with. For beam sweeping, the UE can activate different beams with pre-defined locations and direction around the UE and measure a CSI-RS signal strength through each beam to determine which beam receives the CSI-RS with the greatest signal strength.

In this second scenario, CSI-RS1 may overlap with CSI-RS2 on some or all occasions on time domain, for example, depending on periodicity and time offset of each signal. The UE can decide on which occasions it can perform the CSI-RS1 measurement, and on which occasions it can sweep Rx beams for CSI-RS2.

Figure 10:
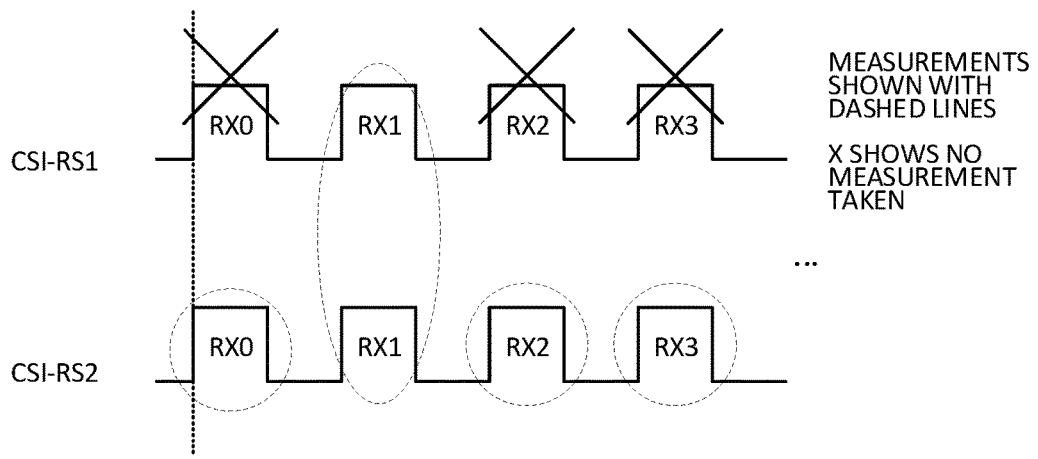
FIG. 10, FIG. 11, and FIG. 12 illustrate examples of CSI-RS communications from cell towers, according to some embodiments.

If all occasions of CSI-RS1 and CSI-RS2 are fully overlapped in the second scenario, as shown in FIG. 10, UE can prioritize Rx beam sweeping for CSI-RS2 measurement. The UE receives and measures CSI-RS1 on the occasions where the Rx beam of CSI-RS1 and the index of beam sweeping for CSI-RS2 are the same. For example, as beam sweeping is performed over Rx0, Rx1, Rx2 . . . etc., CSI-RS2 is measured with each beam. When beam sweeping is indexed at Rx1, both CSI-RS1 and CSI-RS2 are measured through Rx1.

Figure 11:
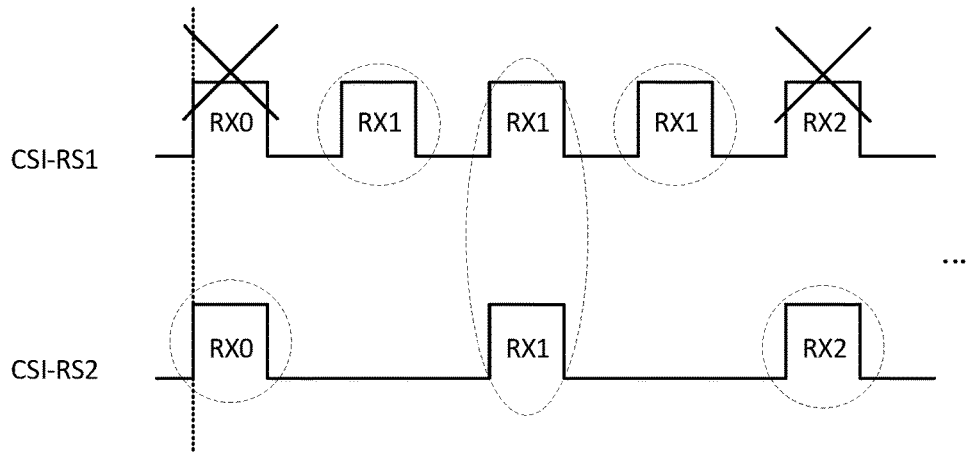

If some occasions of CSI-RS1 are not overlapped (but others are overlapped) with CSI-RS2 as shown in FIG. 11, CSI-RS1 may have a shorter period than CSI-RS2 (e.g., CSI-RS1 has period T and CSI-RS2 has period 2T. The UE can beam sweep for all occasions of CSI-RS2. In such a case, UE can perform CSI-RS1 measurements on the occasions where the beam sweeping index falls on the Rx beam that is associated with CSI-RS1 (e.g., Rx1 in this example). UE can also perform the CSI-RS1 measurement on the occasions of CSI-RS1 that are not overlapped with CSI-RS2, using the known Rx beam for CSI-RS1 (Rx1).

Figure 12:
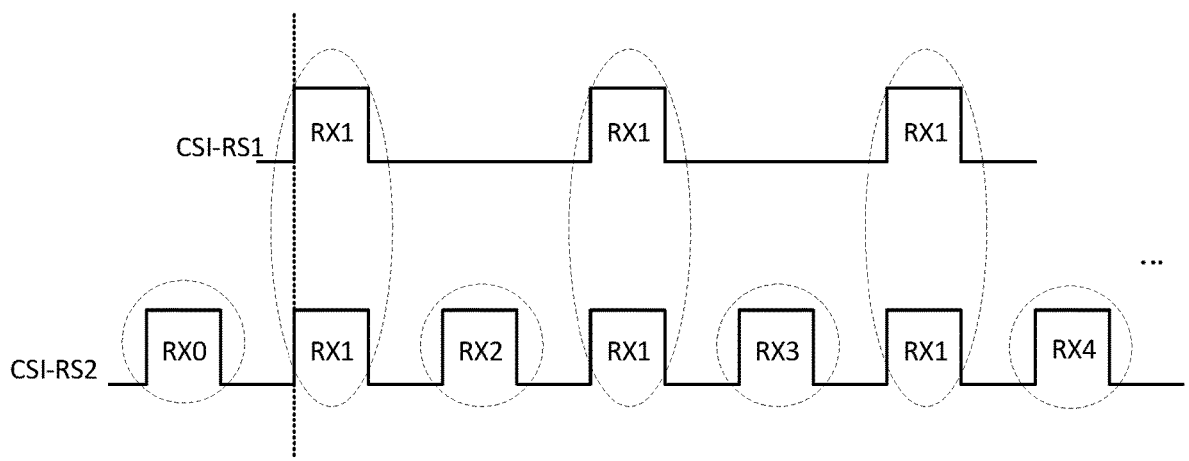

If some occasions of CSI-RS2 are not overlapped (but others are overlapped) with CSI-RS1, as shown in FIG. 12, then UE can perform Rx beam sweeping for CSI-RS2 measurement only on the non-overlapped occasions of CSI-RS2. UE may perform the beam sweeping for CSI-RS2 but skip the Rx beam selected to receive CSI-RS1 in the sweep sequence (Rx1 in this example) which improves efficiency and reduces redundancy. On the overlapped occasions, UE can use the Rx beam associated with CSI-RS1 to receive and measure both CSI-RS1 and CSI-RS2.

Figure 13:
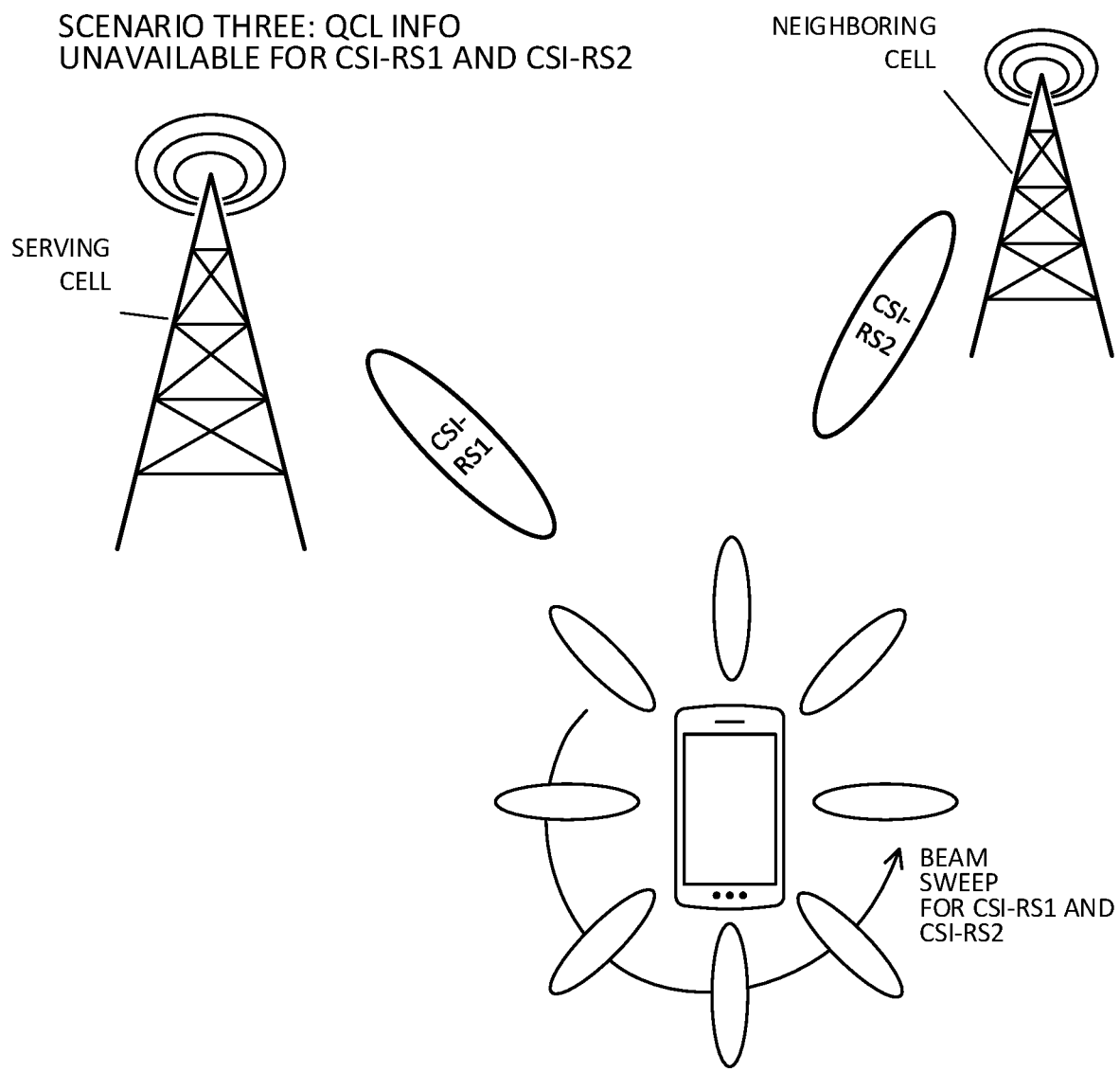
FIG. 13 illustrates UE in communication with a serving cell and neighbor cell where RX beam for receiving CSI-RS is to be determined, according to some embodiments.

Under a third scenario shown in FIG. 13, the CSI-RS of the serving cell and the CSI-RS of the neighboring cell both lack QCL information to determine which Rx beam should be used for receiving the CSI-RS signals, respectively. If neither CSI-RS1 from cell 1 nor CSI-RS2 from Cell 2 has available QCL information, the UE can perform the beam sweeping for both CSI-RS1 and CSI-RS2. For each time period, a single Rx beam can be used for measuring both CSI-RS1 and CSI-RS2. In this case, the UE can use finer beam (more narrow) than typically used for SSB associated with a CSI-RS L3 signal.

Figure 14:
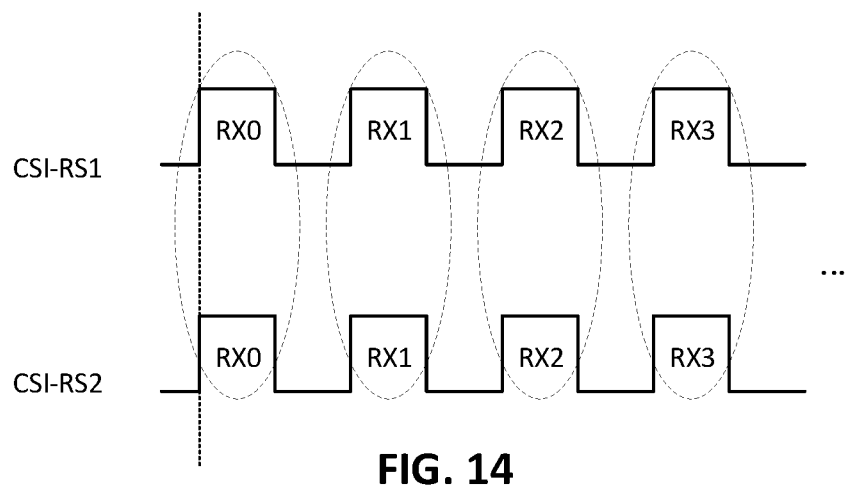
FIG. 14 illustrates an example of CSI-RS1 and CSI-RS2 communication from cell towers, according to some embodiments.

For example, as shown in FIG. 14, beam sweeping can be used to measure both CSI-RS1 and CSI-RS2 by measuring each signal over each Rx beam. CSI-RS1 and CSI-RS2 do not necessarily have to overlap completely, although shown as such in this example.

Figure 15:
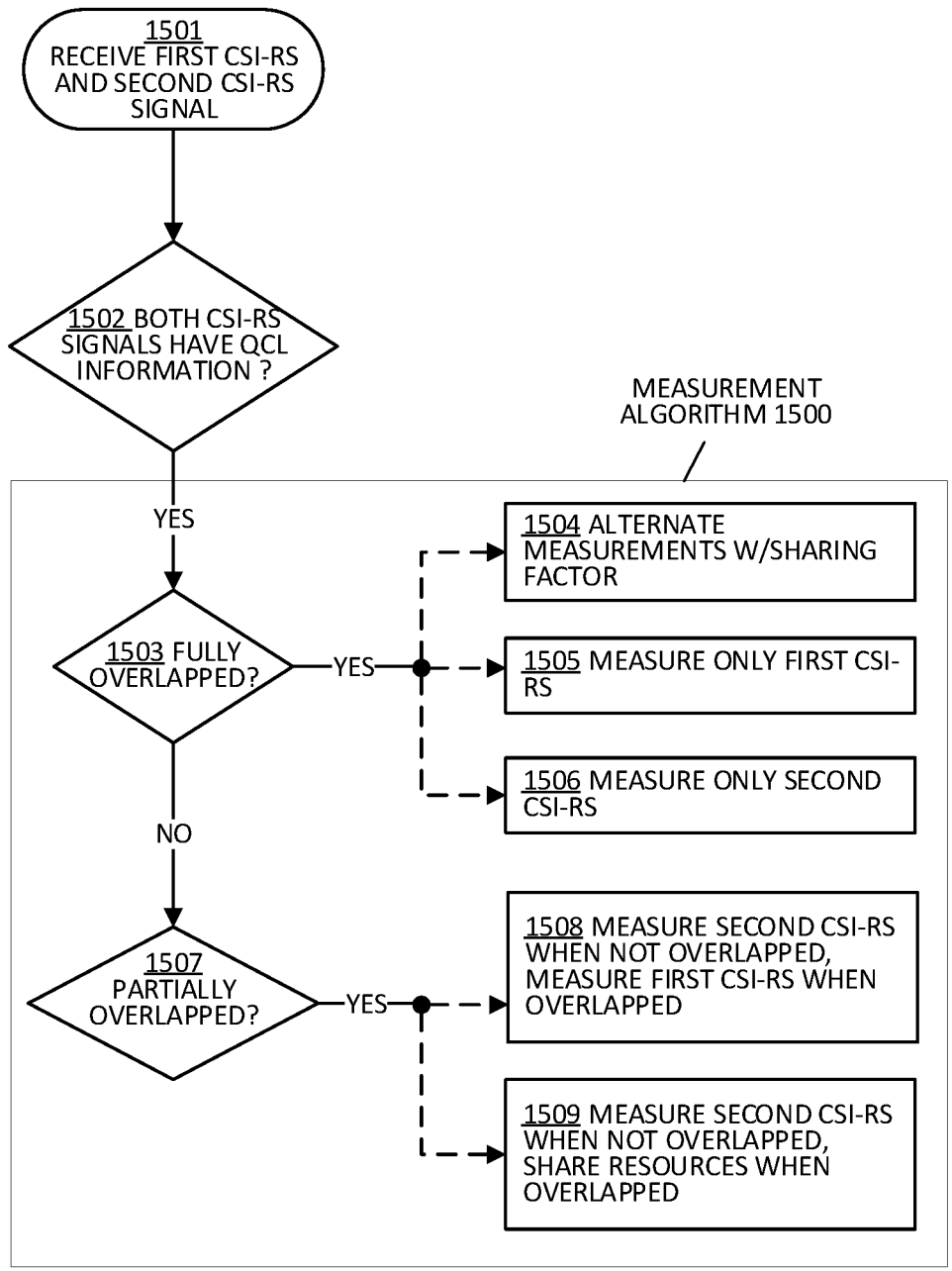
FIG. 15, FIG. 16, FIG. 17, and FIG. 18 illustrate sweeping and measurement algorithms for CSI-RS signals, according to some embodiments.

FIG. 15 shows a process that describes a measurement algorithm 1500 for CSI-RS signals according to some embodiments, for example, in response to the first scenario shown in FIG. 6. At operation 1501, the process includes receiving a first CSI-RS signal through a first cell and a second CSI-RS signal through a second cell. The first CSI-RS signal and the second CSI-RS signal can be periodic, e.g., transmitted periodically over time.

At operation 1502, if respective QCL information is available to determine a first Rx beam to measure the first CSI-RS signal and a second Rx beam to measure the second CSI-RS signal, then the process can proceed to operation 1503 or operation 1507. It should be noted that although the process is shown as sequentially performed through operation 1503 to proceed to 1507, this is not required. The process proceeds depending on the situation of the CSI-RS signals as described.

At operation 1503, if the first CSI-RS signal and the second CSI-RS signal are fully overlapped, then the process can proceed to any one of three options. At option 1504, the process includes sharing resources by alternating between measuring the first CSI-RS signal with the first Rx beam and measuring the second CSI-RS signal with the second Rx beam. At option 1505 the process includes measuring only the first CSI-RS signal with the first Rx beam. At option 1506, the process includes measuring only the second CSI-RS signal with the second Rx beam.

At operation 1507, if some occasions of the second CSI-RS signal are not overlapped with the first CSI-RS signal (but others are overlapped), then the process can proceed to any of two options. At option 1508, the process includes measuring the second CSI-RS signal when not overlapped, and measuring the first CSI-RS signal when overlapped. At option 1509, the process includes measuring the second CSI-RS signal when not overlapped, and alternating between measuring the first CSI-RS signal and the second CSI-RS signal when overlapped. It should be understood that the options can selected based on application and/or network behavior or network conditions.

Figure 16:
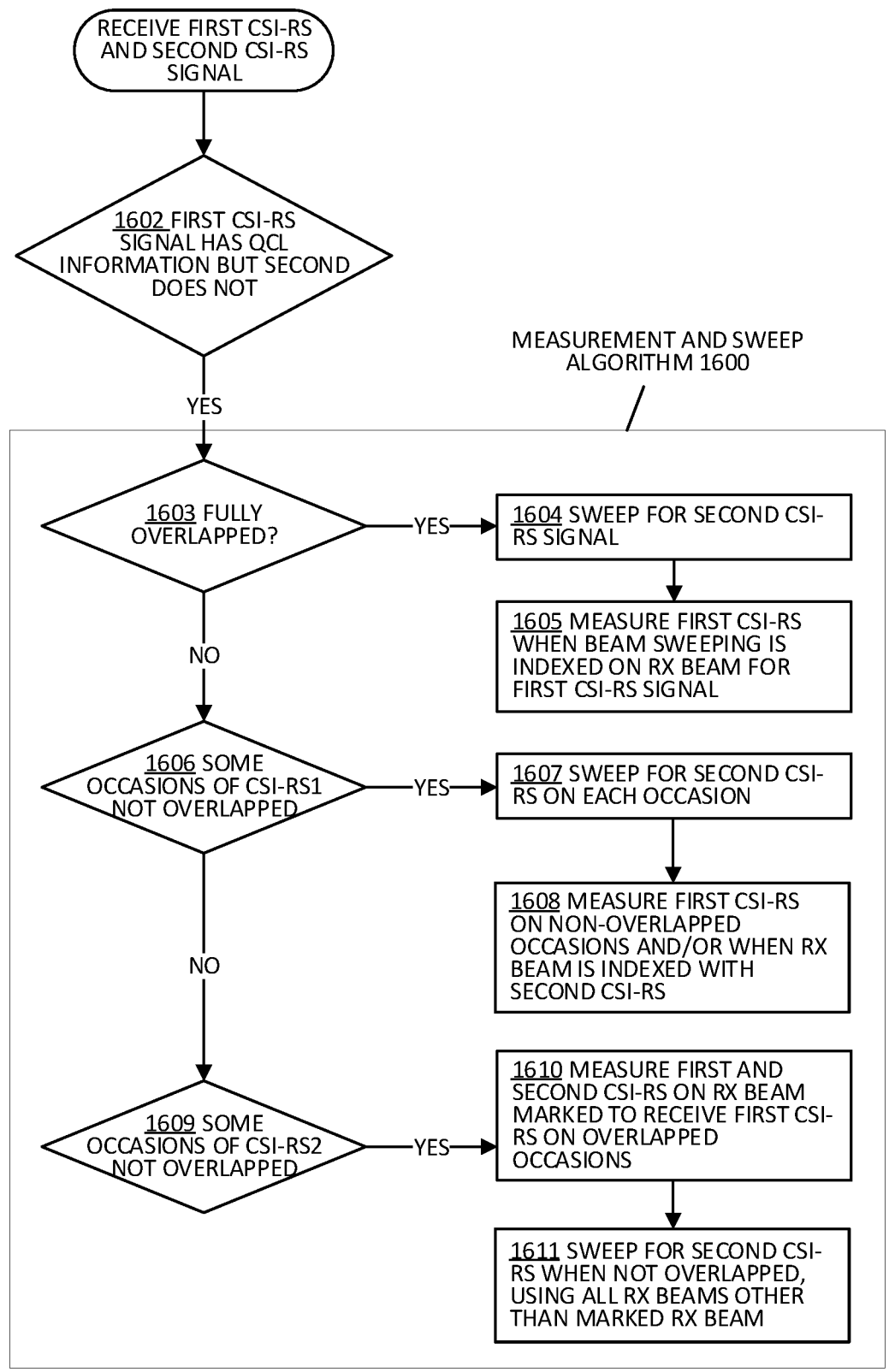

FIG. 16 shows a process according to some embodiments that describes a measurement and sweeping algorithm 1600 for CSI-RS signals, for example, in response to the second scenario shown in FIG. 9. A first CSI-RS signal and a second CSI-RS signal are received by the UE. At operation 1602, if the respective QCL information is available to determine the first Rx beam to measure the first CSI-RS signal, and the respective QCL information is not available to determine the second Rx beam, then the process proceeds to operation 1603, 1606, or 1609, depending on the condition. The operations 1603, 1606, and 1609 need not be performed sequentially as shown.

At operation 1603, if the first CSI-RS signal and the second CSI-RS signal are fully overlapped, then the process can proceed to operation 1604. Full overlap can occur when both signals have the same period and same time offset. Thus, the CSI-RS signals are received at the UE at the same time and the UE must resolve how to measure both signals.

At operation 1604, the process includes beam sweeping over a plurality of Rx beams that includes the first Rx beam, to measure the second CSI-RS signal over each of the plurality of Rx beams. At operation 1605, the process includes measuring the first CSI-RS signal (and the second CSI-RS signal together) when the beam sweeping is indexed on the first Rx beam. The second Rx beam can be determined based on the sweep measurements of the second CSI-RS signal over the plurality of Rx beams (e.g., based on which Rx beam receives the CSI-RS signal with the highest strength). Operations 1604 and 1605 are also described in other sections in relation to FIG. 10.

At operation 1606, if some occasions of the first CSI-RS signal are not overlapped with the second CSI-RS signal (and others are overlapped), then the process can proceed to operation 1607. At 1607, the process includes beam sweeping over a plurality of Rx beams (e.g., Rx1, Rx2, Rx3, etc. as shown in FIGS. 6-14) that includes the first Rx beam, to measure the second CSI-RS signal over each of the plurality of Rx beams. At block 1608, the process includes measuring the first CSI-RS signal with the first Rx beam on a) non-overlapped occasions of the first CSI-RS signal, and/or b) when the beam sweeping is indexed on the first Rx beam. Operations 1607 and 1608 as discussed in other sections in relation to FIG. 11. As discussed, the second Rx beam can be determined based on sweep measurements of the second CSI-RS signal over the plurality of Rx beams.

At operation 1609, if some occasions of the second CSI-RS signal are not overlapped with the first CSI-RS signal (but others are), then the process can proceed to operation 1610. At operation 1610, the process includes measuring, on overlapped occasions, the first CSI-RS signal and the second CSI-RS signal with the first Rx beam. At operation 1611, the process includes beam sweeping over the plurality of Rx beams that does not include the first Rx beam, on non-overlapped occasions of the second CSI-RS signal, to measure the second CSI-RS signal over each of the plurality of Rx beams. In other words, the first Rx beam is skipped during the sweep because the second CSI-RS signal is measured at the first Rx beam at operation 1610. Operations 1610 and 1611 are further described in relation to FIG. 12. The second Rx beam can be determined based on the sweep measurements of the second CSI-RS signal over the plurality of Rx beams.

Thus, based on the above, although the second CSI-RS signal lacked respective QCL information, the UE can manage beams and measurement to determine which Rx beam to use to receive the second CSI-RS signal while also measuring the first CSI-RS signal.

Figure 17:
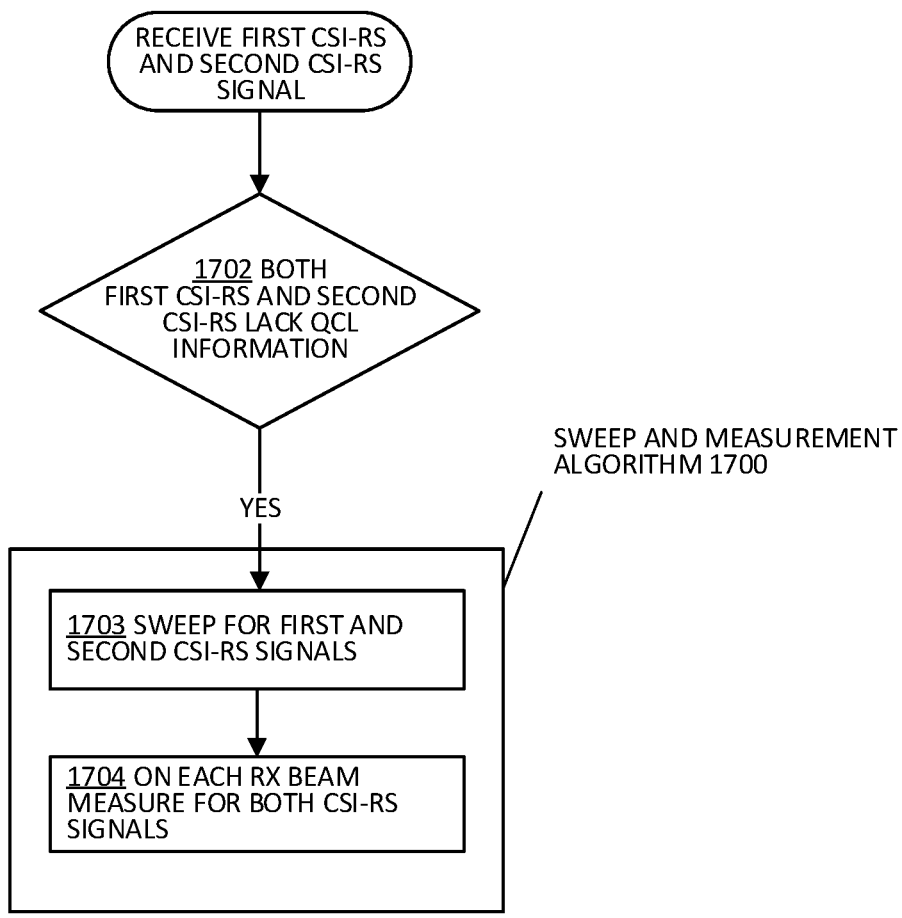

FIG. 17 shows a process according to some embodiments that describes a measurement and sweeping algorithm 1700 for CSI-RS signals, for example, in response to the third scenario shown in FIG. 13. At operation 1702, if the respective QCL information is not available to determine the first Rx beam and the second Rx beam, then the process can proceed to operation 1604. At operation 1703, the process includes beam sweeping over a plurality of Rx beams that includes the first Rx beam and the second Rx beam. At 1704, each of the first CSI-RS signal and the second CSI-RS signal are measured over each of the plurality of Rx beams. The first Rx beam and the second Rx beam can be determined based on measurements of the first CSI-RS signal and the second CSI-RS signal over the plurality of Rx beams. In other words, the Rx beam that yields the highest signal strength for the first CSI-RS can be designated as a first Rx beam to use to receive the first CSI-RS signal. Similarly, the Rx beam that yields the highest signal strength for the second CSI-RS signal can be designated as a second Rx beam to use to receive the second CSI-RS signal. Operations 1604 and 1605 are discussed in other sections, for example, relative to FIGS. 13 and 14.

Figure 18:
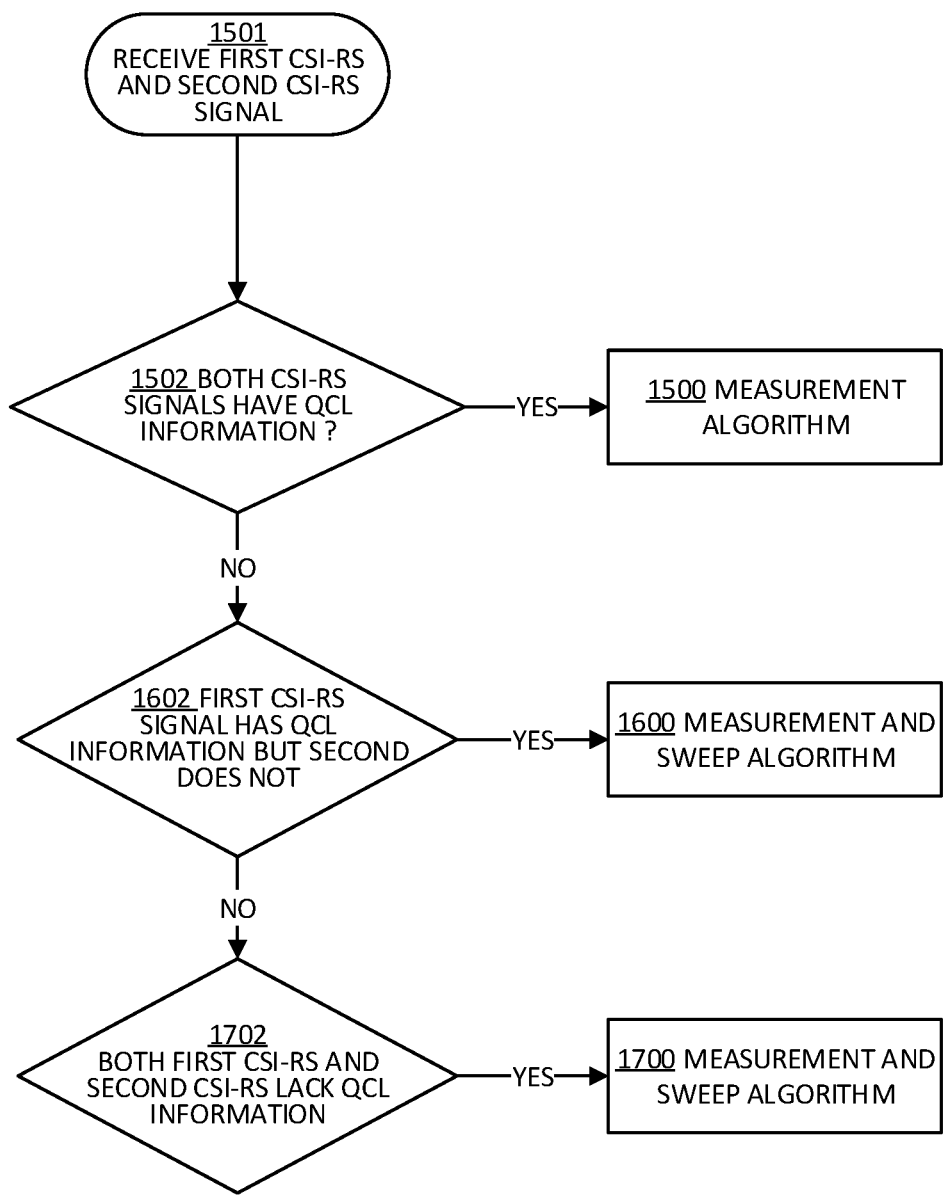

It should be understood that a UE can implement different combinations of the strategies discussed under varying conditions of CSI-RS signals. FIG. 18 shows a combination of strategies according to some embodiments. At operation 1501, a first and second CSI-RS signal are received, as discussed in other sections. At operation 1502, if both CSI-RS signals have available QCL information, the process proceeds to operation 1500, which is described in other sections. At operation 1602, if the first CSI-RS signal has available QCL information but the second CSI-RS signal does not, then the process proceeds to operation 1600, which is described in other sections. At operation 1702, if both the first CSI-RS signal and the second CSI-RS signal both lack respective QCL information, then the process proceeds to operation 1700, which is described in other sections. In such a manner, the UE can implement a comprehensive and adaptive CSI-RS measurement and sweeping strategy for a serving cell and a neighboring cell under the different conditions described.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "selecting," "determining," "receiving," "forming," "grouping," "aggregating," "generating," "removing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A method, performed by one or more processors of a user equipment, comprising:
receiving a first channel state information reference signal (CSI-RS) signal through a first cell and a second CSI-RS signal through a second cell, the first CSI-RS signal and the second CSI-RS signal being periodic;
determining a first Rx beam to measure the first CSI-RS signal and a second Rx beam to measure the second CSI-RS signal based on quasi-colocation (QCL) information;
alternating between measuring the first CSI-RS signal with the first Rx beam and measuring the second CSI-RS signal with the second Rx beam, in response to the first CSI-RS signal and the second CSI-RS signal being fully overlapped; and
performing at least one of a) measuring the second CSI-RS signal when not overlapped, and measuring the first CSI-RS signal when overlapped, or b) measuring the second CSI-RS signal when not overlapped, and alternating between measuring the first CSI-RS signal and the second CSI-RS signal when overlapped, in response to one or more occasions of the second CSI-RS signal not being overlapped with the first CSI-RS signal.

2. The method of claim 1, further comprising, in response to respective QCL information being unavailable to determine the second Rx beam:
determining the first Rx beam to measure the first CSI-RS signal based on the QCL information that is available,
beam sweeping over a plurality of Rx beams that includes the first Rx beam, to measure the second CSI-RS signal over each of the plurality of Rx beams, and measuring the first CSI-RS signal and the second CSI-RS signal when the beam sweeping is indexed on the first Rx beam, when the first CSI-RS signal and the second CSI-RS signal are fully overlapped; and
determining the second Rx beam based on measurements of the second CSI-RS signal over the plurality of Rx beams.

3. The method of claim 1, further comprising, in response to respective QCL information being unavailable to determine the second Rx beam:
determining the first RX beam to measure the first CSI-RS signal based on the QCL information that is available;
beam sweeping over a plurality of Rx beams that includes the first Rx beam, to measure the second CSI-RS signal over each of the plurality of Rx beams, and measuring the first CSI-RS signal with the first Rx beam on a) non-overlapped occasions of the first CSI-RS signal, and b) when the beam sweeping is indexed on the first Rx beam, when one or more occasions of the first CSI_RS signal are not overlapped with the second CSI-RS signal; and determining the second Rx beam based on measurements of the second CSI-RS signal over the plurality of Rx beams.

4. The method of claim 1, further comprising, in response to respective QCL information being unavailable to determine the second Rx beam:

determining the first Rx beam to measure the first CSI-RS signal based on the QCL information that is available;

measuring, on overlapped occasions, the first CSI-RS signal and the second CSI-RS signal with the first Rx beam, and beam sweeping over a plurality of Rx beams that does not include the first Rx beam, on non-overlapped occasions of the second CSI-RS signal, to measure the second CSI-RS signal over each of the plurality of Rx beams when one or more occasions of the second CSI-RS signal are not overlapped with the first CSI-RS signal; and determining the second Rx beam based on measurements of the second CSI-RS signal over the plurality of Rx beams.

5. The method of claim 1, further comprising, in response to the QCL information being unavailable to determine the first RX beam and the second Rx beam:

beam sweeping over a plurality of Rx beams that includes the first Rx beam and the second Rx beam to measure the first CSI-RS signal and the second CSI-RS signal over each of the plurality of Rx beams; and determining the first Rx beam and the second Rx beam based on measurements of the first CSI-RS signal and the second CSI-RS signal over the plurality of Rx beams.

6. The method of claim 1, wherein the first cell is a serving cell of the user equipment, and the second cell is a neighboring cell of the user equipment.

7. The method of claim 1, wherein the QCL information includes quasi-co-location between a) the first CSI-RS signal and a first synchronization signal block from the first cell, b) the first CSI-RS signal and another CSI-RS signal from the first cell, c) the second CSI-RS signal and a second synchronization signal block from the second cell, or d) the second CSI-RS signal and another CSI-RS signal from the second cell.

8. A non-transitory machine-readable medium having executable instructions, that, when executed by a processor of a user equipment, causes the processor to perform operations comprising:

receiving a first channel state information reference signal (CSI-RS) signal through a first cell and a second CSI-RS signal through a second cell, the first CSI-RS signal and the second CSI-RS signal being periodic;

determining a first Rx beam to measure the first CSI-RS signal and a second Rx beam to measure the second CSI-RS signal based on quasi-colocation (QCL) information;

measuring only the first CSI-RS signal with the first Rx beam, in response to the first CSI-RS signal and the second CSI-RS signal being fully overlapped; and performing at least one of a) measuring the second CSI-RS signal when not overlapped, and measuring the first CSI-RS signal when overlapped, or b) measuring the second CSI-RS signal when not overlapped, and alternating between measuring the first CSI-RS signal and the second CSI-RS signal when overlapped, in response to one or more occasions of the second CSI-RS signal not being overlapped with the first CSI-RS signal.

9. The non-transitory machine-readable medium of claim 8, wherein the operations further include: in response to respective QCL information being unavailable to determine the second Rx beam, determining the first Rx beam to measure the first CSI-RS signal based on the QCL information that is available;

beam sweeping over a plurality of Rx beams that includes the first Rx beam, to measure the second CSI-RS signal over each of the plurality of Rx beams, and measuring the first CSI-RS signal and the second CSI-RS signal when the beam sweeping is indexed on the first Rx beam, when the first CSI-RS signal and the second CSI-RS signal are fully overlapped; and determining the second Rx beam based on measurements of the second CSI-RS signal over the plurality of Rx beams.

10. The non-transitory machine-readable medium of claim 8, wherein the operations further include: in response to respective QCL information being unavailable to determine the second Rx beam, determining the first Rx beam to measure the first CSI-RS signal based on the QCL information that is available;

beam sweeping over a plurality of Rx beams that includes the first Rx beam, to measure the second CSI-RS signal over each of the plurality of Rx beams, and measuring the first CSI-RS signal with the first Rx beam on a) non-overlapped occasions of the first CSI-RS signal, and b) when the beam sweeping is indexed on the first Rx beam, when one or more occasions of the first CSI_RS signal are not overlapped with the second CSI-RS signal; and determining the second Rx beam based on measurements of the second CSI-RS signal over the plurality of Rx beams.

11. The non-transitory machine-readable medium of claim 8, wherein the operations further include: in response to respective QCL information being unavailable to determine the second Rx beam, determining the first Rx beam to measure the first CSI-RS signal based on the QCL information that is available;

measuring, on overlapped occasions, the first CSI-RS signal and the second CSI-RS signal with the first Rx beam, and beam sweeping over a plurality of Rx beams that does not include the first Rx beam, on non-overlapped occasions of the second CSI-RS signal, to measure the second CSI-RS signal over each of the plurality of Rx beams when one or more occasions of the second CSI-RS signal are not overlapped with the first CSI-RS signal; and determining the second Rx beam based on measurements of the second CSI-RS signal over the plurality of Rx beams.

12. The non-transitory machine-readable medium of claim 8, wherein the operations further include: in response to the QCL information being unavailable to determine the first Rx beam and the second Rx beam, beam sweeping over a plurality of Rx beams that includes the first Rx beam and the second Rx beam to measure the first CSI-RS signal and the second CSI-RS signal over each of the plurality of Rx beams; and determining the first Rx beam and the second Rx beam based on measurements of the first CSI-RS signal and the second CSI-RS signal over the plurality of Rx beams.

13. The non-transitory machine-readable medium of claim 8, wherein the first cell is a serving cell of the user equipment, and the second cell is a neighboring cell of the user equipment.

14. The non-transitory machine-readable medium of claim 8, wherein the QCL information includes quasi-co-location between a) the first CSI-RS signal and a first synchronization signal block from the first cell, b) the first CSI-RS signal and another CSI-RS signal from the first cell, c) the second CSI-RS signal and a second synchronization signal block from the second cell, or d) the second CSI-RS signal and another CSI-RS signal from the second cell.

15. A user equipment device comprising:
at least one antenna;
at least one radio, wherein the at least one radio is to perform cellular communications using a radio access technology that establishes a wireless link with a serving cell; and
one or more processors, configured to perform operations that include:
receiving a first channel state information reference signal (CSI-RS) signal through the serving cell and a second CSI-RS signal through a neighboring cell, the first CSI-RS signal and the second CSI-RS signal being periodic;
determining a first Rx beam to measure the first CSI-RS signal and a second Rx beam to measure the second CSI-RS signal based on quasi-colocation (QCL) information, then
measuring only the second CSI-RS signal with the second Rx beam, in response to the first CSI-RS signal and the second CSI-RS signal being fully overlapped; and
performing at least one of a) measuring the second CSI-RS signal when not overlapped, and measuring the first CSI-RS signal when overlapped, or b) measuring the second CSI-RS signal when not overlapped, and alternating between measuring the first CSI-RS signal and the second CSI-RS signal when overlapped, in response to one or more occasions of the second CSI-RS signal not being overlapped with the first CSI-RS signal.

16. The user equipment device of claim 15, wherein the operations further include: in response to respective QCL information being unavailable to determine the second Rx beam,
determining the first Rx beam to measure the first CSI-RS signal based on the QCL information that is available,
beam sweeping over a plurality of Rx beams that includes the first Rx beam, to measure the second CSI-RS signal over each of the plurality of Rx beams, and measuring the first CSI-RS signal and the second CSI-RS signal when the beam sweeping is indexed on the first Rx beam, when the first CSI-RS signal and the second CSI-RS signal are fully overlapped; and
determining the second Rx beam based on measurements of the second CSI-RS signal over the plurality of Rx beams.

17. The user equipment device of claim 15, wherein the operations further include: in response to the respective QCL information being unavailable to determine the second Rx beam, determining the first Rx beam to measure the first CSI-RS signal based on the QCL information that is available;
if some occasions of the first CSI-RS signal are not overlapped with the second CSI-RS signal, then beam sweeping over a plurality of Rx beams that includes the first Rx beam, to measure the second CSI-RS signal over each of the plurality of Rx beams, and measuring the first CSI-RS signal with the first Rx beam on a) non-overlapped occasions of the first CSI-RS signal, and b) when the beam sweeping is indexed on the first Rx beam, when one or more occasions of the first CSI_RS signal are not overlapped with the second CSI-RS signal; and
determining the second Rx beam based on measurements of the second CSI-RS signal over the plurality of Rx beams.

18. The user equipment device of claim 15, wherein the operations further include: in response to respective QCL information being unavailable to determine the second Rx beam,
determining the first Rx beam to measure the first CSI-RS signal based on the QCL information that is available;
if some occasions of the second CSI-RS signal are not overlapped with the first CSI-RS signal, then measuring, on overlapped occasions, the first CSI-RS signal and the second CSI-RS signal with the first Rx beam, and beam sweeping over a plurality of Rx beams that does not include the first Rx beam, on non-overlapped occasions of the second CSI-RS signal, to measure the second CSI-RS signal over each of the plurality of Rx beams when one or more occasions of the second CSI-RS signal are not overlapped with the first CSI-RS signal; and
determining the second Rx beam based on measurements of the second CSI-RS signal over the plurality of Rx beams.

19. The user equipment device of claim 15, wherein the operations further include: in response to the QCL information being unavailable to determine the first Rx beam and second Rx beam,
beam sweeping over a plurality of Rx beams that includes the first Rx beam and the second Rx beam to measure the first CSI-RS signal and the second CSI-RS signal over each of the plurality of Rx beams; and
determining the first Rx beam and the second Rx beam based on measurements of the first CSI-RS signal and the second CSI-RS signal over the plurality of Rx beams.

20. The user equipment device of claim 15, wherein the QCL information includes quasi-co-location between a) the first CSI-RS signal and a first synchronization signal block from the serving cell, b) the first CSI-RS signal and another CSI-RS signal from the serving cell, c) the second CSI-RS signal and a second synchronization signal block from the neighboring cell, or d) the second CSI-RS signal and another CSI-RS signal from the neighboring cell.

* * * * *